Oct. 22, 1935.  E. R. SCHOFIELD  2,018,383
AUTOMATIC TIDE GATE AND SEWAGE REGULATOR
Filed Feb. 16, 1934  6 Sheets-Sheet 1

INVENTOR
Edwin R. Schofield
BY
his ATTORNEY

Oct. 22, 1935.   E. R. SCHOFIELD   2,018,383
AUTOMATIC TIDE GATE AND SEWAGE REGULATOR
Filed Feb. 16, 1934   6 Sheets-Sheet 3

INVENTOR
Edwin R. Schofield
BY
his ATTORNEY

Oct. 22, 1935.  E. R. SCHOFIELD  2,018,383
AUTOMATIC TIDE GATE AND SEWAGE REGULATOR
Filed Feb. 16, 1934   6 Sheets-Sheet 4

INVENTOR
Edwin R. Schofield
BY
his ATTORNEY

Oct. 22, 1935.   E. R. SCHOFIELD   2,018,383
AUTOMATIC TIDE GATE AND SEWAGE REGULATOR
Filed Feb. 16, 1934   6 Sheets-Sheet 5

INVENTOR
Edwin R. Schofield
BY
his ATTORNEY

Oct. 22, 1935.  E. R. SCHOFIELD  2,018,383
AUTOMATIC TIDE GATE AND SEWAGE REGULATOR
Filed Feb. 16, 1934  6 Sheets—Sheet 6

INVENTOR
Edwin R. Schofield
BY
his ATTORNEY

Patented Oct. 22, 1935

2,018,383

UNITED STATES PATENT OFFICE 2,018,383

AUTOMATIC TIDE GATE AND SEWAGE REGULATOR

Edwin R. Schofield, Philadelphia, Pa.

Application February 16, 1934, Serial No. 711,495

19 Claims. (Cl. 137—78)

This invention relates to an automatic tide gate and sewage regulator that is particularly adapted for use where a sewer normally discharges into a collecting or interceptor sewer adjacent to tide water. This apparatus acts normally to prevent the tide from entering the collecting sewer, but in the case of an excessive flow due, for example, to a storm acts to discharge the excessive amount of liquid into the tidal stream rather than into the collecting sewer.

The main object of the invention is to provide efficient control means of the general character referred to above. An important feature of the invention relates to the prevention of an abnormal flow from a sewer into a collecting sewer. Another feature relates to the exclusion, under normal conditions, of the tide from both the collecting sewer and the sewer discharging into the collecting sewer. Another feature relates to exclusion from the collecting sewer of storm water and the discharge of such storm water into the tidal water. A further feature relates to means whereby the communication between the discharging sewer and the collecting sewer is shut off and communication between the discharging sewer and the tidal stream is established when the flow of sewage increases to an excessive amount, such action being reversed when the flow in the discharging sewer decreases.

According to a preferred form of carrying out the invention a sluice gate is placed across the end of the discharging sewer so as to prevent the tide from entering the discharging sewer and passing through a suitable passage into the collecting sewer. In general the rise and fall of the tide does not affect the action of the sluice gate in any way. However, in the event that a storm occurs, the sewage level rises in the discharging sewer and raises a float of a float controlled means which acts to throw into operation suitable means, such as a water motor or an electric motor, to open the sluice gate and thereby permit the storm water to pass out into the tidal stream or body of water and at the same time to close a port through which the sewage normally passes into the collecting sewer, thus preventing the storm water and the tide from entering the collecting sewer. Upon completion of the discharge of the storm water and also recession of the tide, the lowering of the float causes reversal of the operation, thus closing the sluice gate and opening the port to permit the sewage to again enter the collecting sewer.

A water motor has many advantages for use in this kind of apparatus, in that it will not be damaged by overloading, merely being stopped if sufficiently overloaded and starting up again as soon as the overload is removed. It is also desirable in many instances to locate the float of the control apparatus a considerable distance from the sluice gate so that the gate may be at or near the sewer outlet and the float may be at a point where it will not be subjected to tidal influence. If the sluice gate be located far from the river, the sewer work involved is expensive since the pipe from the collecting sewer to the diversion point will usually be quite long. It is also advantageous to place the collecting sewer as near the river as possible to obviate the necessity for additional sewers between the tidal stream and the collecting sewer. It will be evident that it is good practice to have the point of diversion at or near the collecting sewer, as is possible with a remote float control, and to place the collecting sewer as near the tidal stream as possible.

Other objects, features and advantages will appear upon consideration of the following detailed description and of the drawings, in which.

Referring to the drawings, reference numeral 20 designates a local or district sewer carrying sewage from a certain area and normally discharging into a collecting or interceptor sewer 21 preferably extending along the side of a tidal stream or body of water and leading to a sewage disposal plant.

According to the illustrative embodiment of the invention, shown in the drawings, the sewage discharged from the sewer 20 passes into a suitable collecting or intercepting chamber 22 provided with a transverse wall or barrier 23. The intercepting chamber is offset horizontally with respect to the sewer 20 and the transverse wall 23 is provided opposite the discharge end of said sewer 20 with an opening or outlet 24 through which flood water or excess sewage may pass into an excess flow sewer 25 discharging directly into the tidal stream or the like. As illustrated, the excess flow sewer 25 may be substantially an extension of sewer 20. At one side of the large opening 24 in the wall 23, there may be provided a port or opening 26 through which and a duct or pipe 27 the sewage is normally discharged into the collecting sewer 21.

Figure 1:
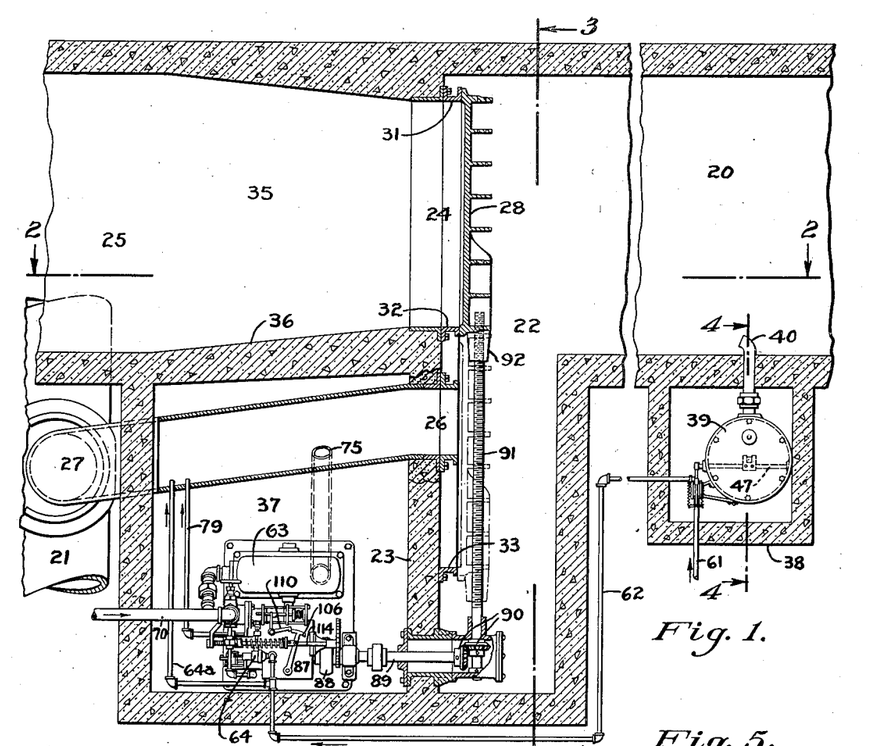
Fig. 1 is a horizontal section of an illustrative embodiment of the invention.
Figure 2:
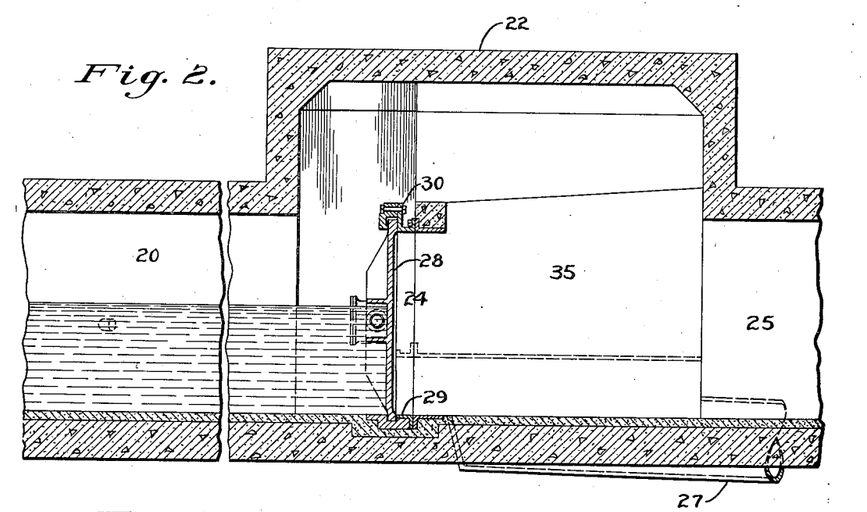
Fig. 2 is a vertical section taken along the line 2—2 of Fig. 1.
Figure 3:
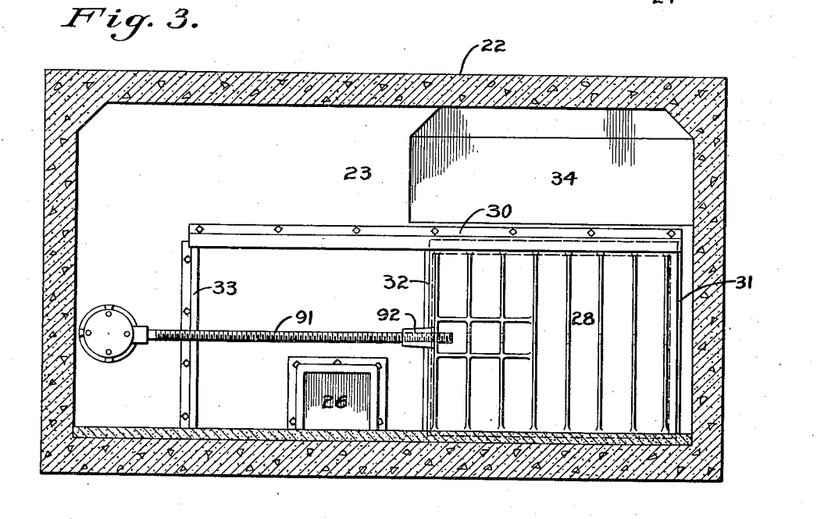
Fig. 3 is a vertical section taken along the line 3—3 of Fig. 1.
Figure 4:
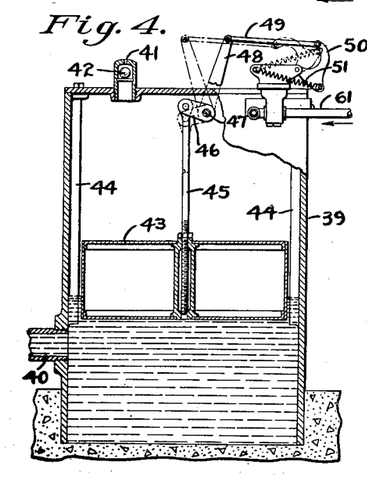
Fig. 4 is a vertical section taken along the line 4—4 of Fig. 1.

The passage of the sewage through the openings 24 and 26 may be controlled by suitable means including a movable sluice gate 28 preferably horizontally slidable and so controlled as to expose the opening 26 and close the opening 24, in the event that the sewage flow is normal, and to expose the opening 24 and close the opening 26 when the flow is abnormally large and the liquid level is high in the sewer. Preferably the lower edge of the gate 28 slides in a groove in a guide 29 flush with the floor of the chamber 22 and the upper edge of the door slides in a guide 30 secured to the wall 23. The sluice gate fits closely in the guides at the upper and lower edges thereof and, when it is in its normal position closing the opening 24, fits closely against upright frame members 31 and 32 at opposite sides of the opening. It is also desirable to completely shut off the port 26 when the flood-water-discharge opening is completely exposed. To this end provision may be made of a suitably positioned upright 33 (Figs. 1 and 3) fitting tightly against the lower guide 29 and the upper guide 30.

In the event that the flood water does not pass off fast enough through the opening 24, due for example to failure of the gate to open or to open fast enough, the excess water may rise above the top of the gate and discharge through an opening 34, in the wall 23 above the opening 24, into a passage 35 communicating directly with the overflow-discharge sewer 25. This passage 35 in the chamber 22 may be shut off from the rest of the chamber 22 at the same side of the transverse wall 23 by a wall 36 thus forming a compartment or chamber 37 suitable for use in housing the gate-operating mechanism or a major portion thereof.

The sluice gate 28 is to be actuated automatically so that it will move to open the discharge opening 24 and close the opening 26 when the sewage at a predetermined point in the sewer 20 rises to or above a predetermined level. Preferably the desired effect is obtained by suitable motor means preferably located in the compartment 37 and adapted to operate the gate 28 in either direction and suitable float-operated control means which may be located at any suitable point but preferably at a point remote from the sluice gate. By using a remote float control device, it is possible to place the float at a considerable distance, say several blocks, away from the sluice gate where it will not be influenced by the tide. Preferably the float-operated control device is located in a chamber 38 (Fig. 1) adjacent to the local or district sewer 20, and is constructed substantially as follows:

Mounted in the chamber or compartment 38 is a closed tank 39, the lower part of which is connected by an inlet or inlet pipe 40 with the sewer 20 so that the liquid level in the tank will rise and fall with that in the sewer. To avoid interference with the rise and fall of the liquid in the tank, the tank is provided at its top with an air vent 41, and to prevent liquid from flowing out of the air vent the vent is equipped with suitable means such as a valve 42. Inside the tank is a hollow float 43 which is guided in its upward and downward movements by suitable guides 44.

The movement of the float is transmitted through an elongated member or link 45 and an arm 46 to a rock shaft 47 extending to the outside of the tank where it is provided with an arm 48. The arm 48 is in turn connected by a link 49 with a rocking member 50 which is urged to either one side or the other of a central position by suitable means, such as a helical spring 51, to close or open a snap valve device 52 in accordance with the downward or upward movement of the float 43. In its snap action, the spring 51 varies the degree of submersion of the float. The rocking member 50 is mounted on a pivot 52a so as to swing about a fixed axis, and acts, preferably through a pin-and-slot connection to swing downwardly or upwardly a pivoted arm or lever 53 mounted on a pivot 54.

Acting through a suitable connection, illustrated as a pin-and-slot connection, the arm 53 acts to advance or retract a valve stem 56 and thereby open and close the snap valve by moving a valve member 57 away from and into engagement with a valve seat 58, upward movement of the valve stem being limited by engagement of a collar 59 thereon with the lower surface of a gland member 60. The valve device 52 controls the passage of water from a pipe 61, connected with any suitable source of supply of water under pressure, to a pipe 62 extending into the chamber 37 in which is located apparatus including a water motor 63 utilized in operating the sluice gate 28. As shown the valve is balanced.

When water under pressure is admitted to the pipe or line 62, due to opening of the valve device 52, the water operates an hydraulic tripper 64 (Fig. 9) which will be described hereinafter and upon relief of pressure in this pipe through closing of the valve device 52, the water will drain out of the pipe 62 through a weeper 64a draining into the passage or pipe 27 and permit restoration of the tripper to its original condition. When water under pressure is supplied through pipe 62 it enters a chamber 65 and advances a piston 66 and a stem 67 against the action of a spring 68 which upon release of pressure in the pipe 62 returns the piston to its original position. The stem 67 carries a double-acting cam 69 which in its movement in either direction acts to trip suitably set mechanism and thereby start the motor and through correspondingly set operating connections start the opening or closing of the gate 28.

Figure 6:
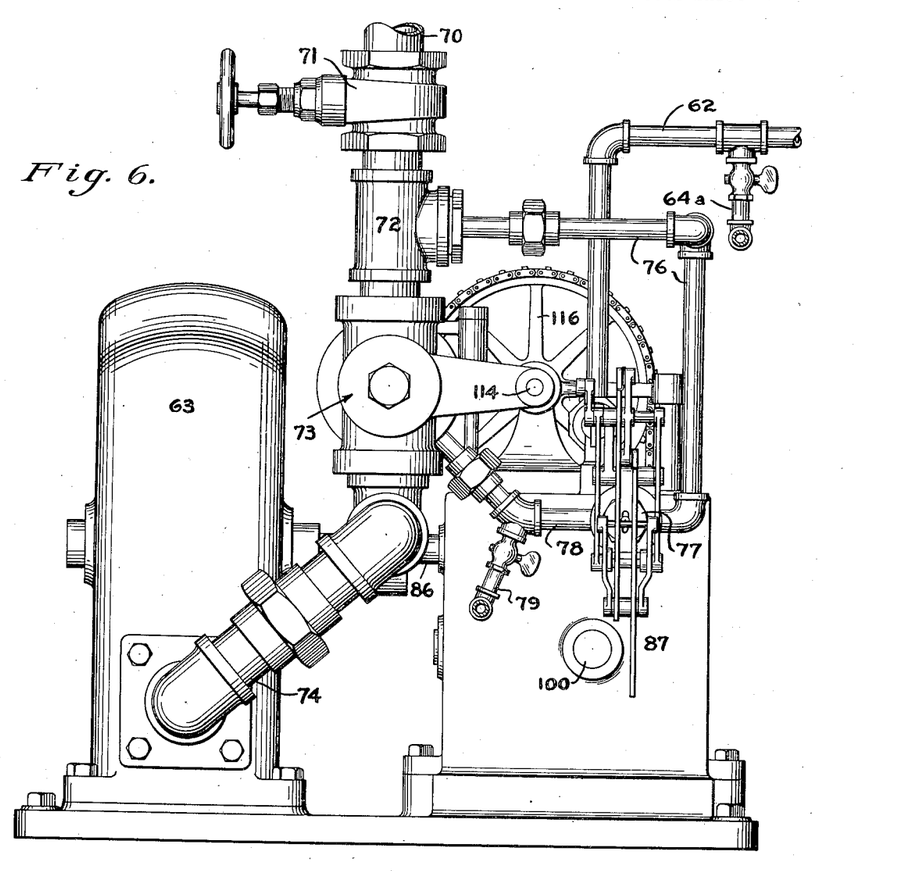
Fig. 6 is an end elevation of the gate-operating mechanism.

The water to operate the motor is supplied under sufficient pressure through a pipe 70 (Fig. 6) which may be provided with suitable controlling means such as a manually operated gate valve 71. After passing through the valve 71, the water passes through the top of a T-fitting 72 to an automatically controlled shutoff valve 73 from which, when open, the water passes through a pipe 74 to the motor 63 to operate the same. From the motor the water passes through a tail race or pipe 75 (Fig. 1) to the conduit 27.

The other branch of the T-fitting 72, is connected by a pipe 76 to a valve 77 through which when open the water passes to a pipe 78 provided with an adjustable weeper 79 and leading to a chamber 80 associated with the shutoff valve 73. The pressure of the water in the chamber 80 (Fig. 11), if sufficient, will force back a piston 81 and shift a balanced valve 82 away from a seat 83 to open the passage leading to the motor. This shifting of the balanced valve is effected against the resistance of a helical spring 84 which may be housed in the cylindrical body of the piston with one end engaging the head of the piston and the other end engaging a fixed member 85. As long as the valve 77 remains open, the balanced shutoff valve 73 will remain open and the motor 63 will operate unless stalled by overload of some kind. Closing of the valve 77 shuts off the supply of water to the pipe 78 and the water in this pipe and the chamber 80 will flow out slowly through the weeper 79, thus allowing the spring 84 to gradually close the shutoff valve 73 and cause the motor 63 to stop.

Figure 12:
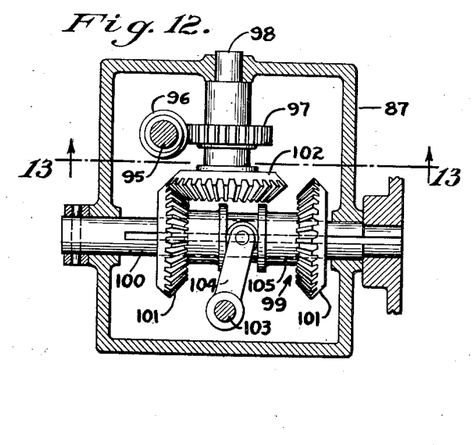
Fig. 12 is a section taken along the line 12—12 of Fig. 7.
Figure 13:
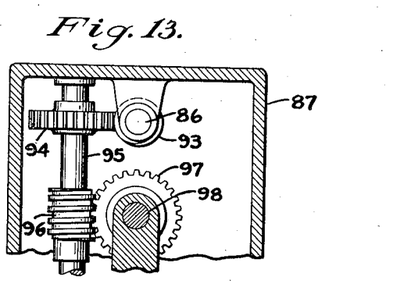
Fig. 13 is a section taken along the line 13—13 of Fig. 12.

The opening and closing of the valve 77 is controlled partly by the hydraulic tripper 64 and partly by other means which includes the driving connections between the motor 63 and the sluice gate 28. The rotor (not shown) of the motor drives a shaft 86 which through a suitable speed reducing and reversing device 87 (Fig. 12), a lost motion coupling 88, a shaft 89 and bevel gears 90, drives a screw 91 threaded into a nut 92 carried by the sluice gate 28. It will be evident that rotation of the screw 91 in one direction will open the gate and rotation thereof in the opposite direction will close the gate.

As illustrated, the worm reducer 87 includes a worm 93 on the shaft 86, a worm gear 94 meshing with worm 93, a vertical shaft 95 carrying the worm gear 94, a worm 96 on the shaft 95, a worm gear 97, and a shaft 98 carrying the worm gear 97. For reversing purposes, provision is made of a clutch element 99 slidable on a shaft 100 connected with one part of the lost motion coupling 88. This clutch element includes two bevel gears 101 either one of which may be brought into mesh with a corresponding bevel gear 102 on the shaft 98 and thus produce the desired direction of turning of the screw 91. The arrangement may be such that with the clutch member 99 in its Fig. 12 position the motor will serve to move the sluice gate to closed position and that with the clutch member shifted in the opposite direction the motor when operating will act to open the sluice gate. The shifting of the clutch member 99 may be effected by means including a rock shaft 103 and a device or arm 104 extending between two collars or circular flanges 105 on such clutch member.

Rocking of the shaft 103 may be effected by means including a reversing arm or lever 106 mounted on the shaft 103, a so-called limit nut 107, a screw 108 for actuating the nut in one direction or the other, and a yielding connection between the limit nut and the arm including a helical spring 109 which may be used to shift the reversing lever in either direction. The reversing lever 106 may be held in either of its extreme positions by suitable means such as pivoted member or lever 110 serving as a trigger. Then, when the spring 109 has been compressed or stretched, as the case may be, the trigger may be engaged by a trigger-operating member 111 and shifted so as to release the lever 106 to the action of the spring 109.

Figure 8:
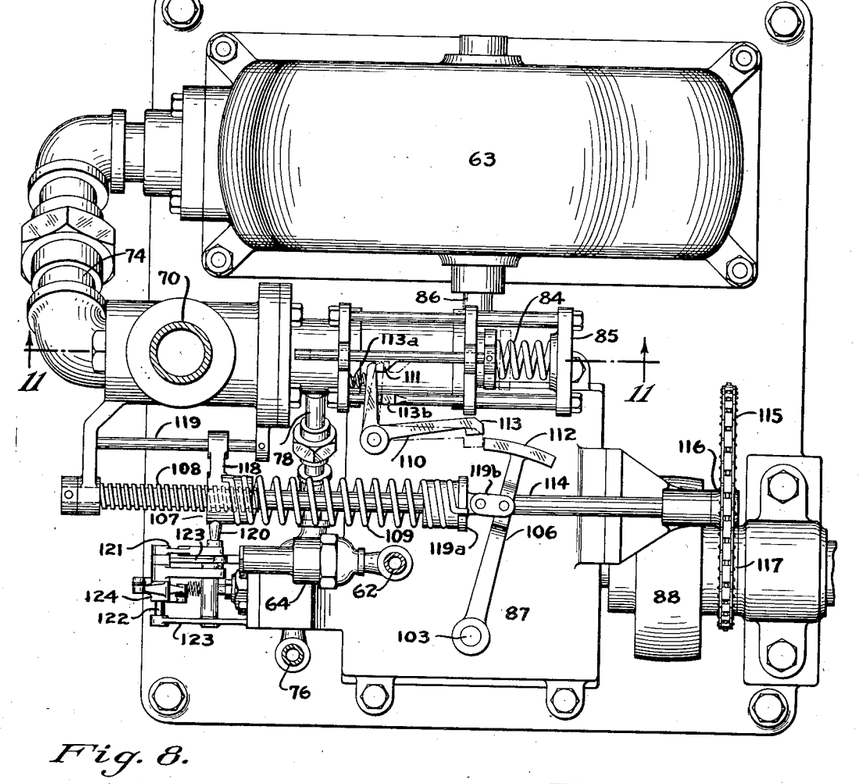
Fig. 8 is a top plan view of the structure shown in Fig. 6.
Figure 11:
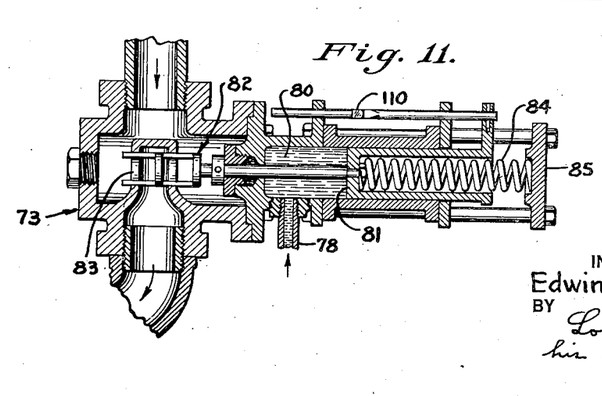
Fig. 11 is a section taken along the line 11—11 of Fig. 8.

As shown clearly in Figs. 8 and 11, the member 111 is connected with the operating piston 81 of the shutoff valve 73 so as to move therewith. The arrangement is such that the trigger is tripped only at the end of the closing action of the shutoff valve 73. As disclosed, the reversing lever is provided at its free end with an arcuate part 112 to engage a downwardly extending locking part 113 of the trigger and support the trigger until the reversing lever is in position to be latched thereby. The trigger 110 is urged by a spring 113a in a direction to depress the locking part 113 and a stop 113b limits the movement of the trigger in this direction.

The screw 108 is fixed on a shaft 114 journalled in suitable bearings and operated in any suitable manner, as by means of a sprocket chain 115 passing around a sprocket wheel 116 on the shaft 114 and a sprocket wheel 117 on the shaft 89. Thus the screw 108 is turned in one direction during the closing of the sluice gate and in the other direction during the opening thereof. Of course the limit nut 107 must be held against turning with the screw. This may be provided for in any suitable manner—for example by means of a part 118 projecting from the limit nut and embracing a fixed guide 119 extending parallel to the axis of the screw. Adjacent to the reversing lever 106 the spring 109 is attached to a member 119a slidable on the shaft 114 and connected with the reversing lever 106 by means of links 119b.

The limit nut 107 may also be used to close the valve 77 and stop the motor 63 at the end of each opening or closing of the sluice gate 28. For this purpose the limit nut is provided with a projection or pin 120 extending into a longitudinal slot in an arm 121 mounted on a shaft 122 journalled in spaced brackets 123. Also fixed on the shaft 122 is a double arm or lever 124 perpendicular to the arm 121 and provided at opposite ends thereof with pivotally supported depending hooks or latches 125 urged by springs 126 in direction to engage a pin 127 connecting two plates 128 mounted on a pivot 129 and constituting in connection with other parts a lever 130 for use in effecting a snap operation of the valve 77. This lever also includes a valve-operating pin 131 adjacent to the pivot 129, stop projections 132 on the plates 128 to engage a fixed member 132a and limit the movement of lever 130 so as to limit the downward movement of the pin 127, and a pin 133 from which extends a helical spring 134 attached at the other end to a fixed member and designed to urge the lever in a direction to place the pin 127 in its lowermost position.

Figures 16, 17:
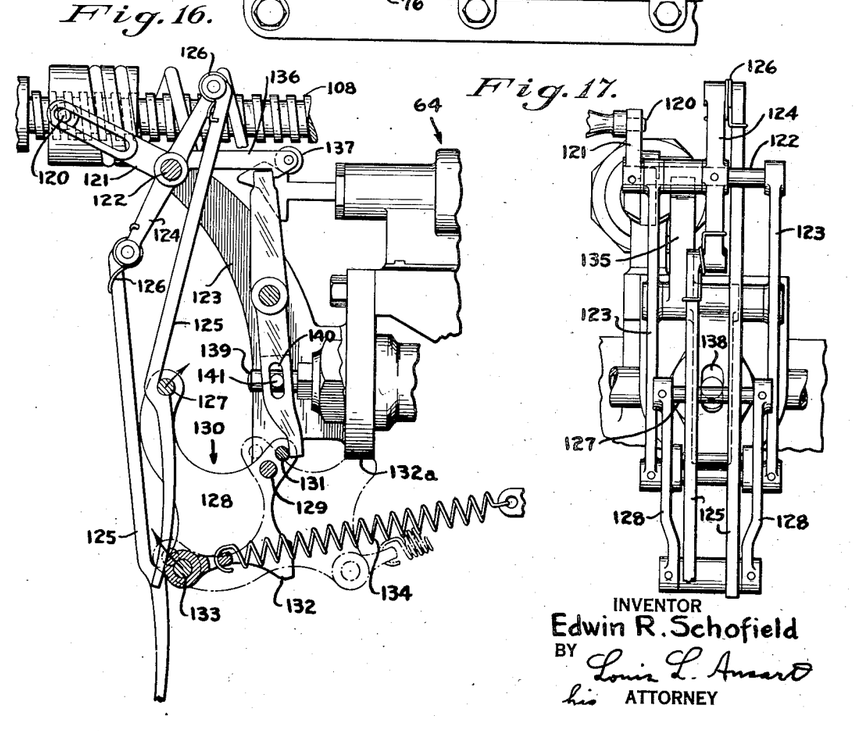
Fig. 16 is a side elevation of part of the structure shown in Fig. 15.
Fig. 17 is an end elevation of the structure shown in Fig. 16.

The arrangement is such that when the arm 130 is swung upwardly against the action of the spring 134, the valve operating pin 131 will engage the lower end of a lever 135 and operate this lever to close the valve 77 and place its upper end in position to be engaged and held by a latch or trigger 136 which may be pivotally mounted on the shaft 122 and may be provided with a lateral projection in the form of a roller 137 arranged to be engaged and lifted by the double cam 69 of the hydraulic tripper 64 as the cam moves in either direction. As illustrated, the lower arm of the lever 135 has an opening 138 (Fig. 17) to receive the stem 139 of the valve 77 and at opposite sides of the opening 138 is provided with longitudinal slots 140 to receive the ends of a pin 141 carried by the stem 139.

The valve 77 may include a usual valve seat 142 and valve proper 143 and preferably, in view of the positive inward actuation of the stem 139, the valve 143 is yieldably supported on the stem by means including a spring 144 interposed between the member 143 and a member or piston 145 fixed on the stem 139 and slidable in a cylindrical passage in the valve casing. With this arrangement, the pressure in the line 76 is continuously urging the valve 143 to open position, that is the valve is unbalanced. The arrangement is preferably such as to provide a chamber 146 back of the piston and provided with a suitable vent 147.

Under normal conditions the gate 28 is closed and the port 26 leading to the intercepting sewer 21 is open. The reversing gear is in position to open the gate (see Fig. 12) and the reversing lever 106 is held in its corresponding position by the actuating spring 109 maintained under compression by the limit nut 107 which is at the right hand end of its path of travel (Fig. 8). The float 43 is down and the snap valve 52 is closed.

Upon rising of the water in the sewer 20, due for example to a storm, the float 43 rises and by means of intermediate parts 45, 46, 47, 48, 49, etc. carries the lever 50 past center with respect to the pivot 52a, thus producing a slow initial movement and a quick final movement of the valve 57 to open position. This admits water under pressure to pass through the pipe 62 and operate the hydraulic tripper 64 (Fig. 9) thereby lifting the latch 136 and releasing the upper end of the lever 135, thus permitting the opening of the valve 77 and the admission of water under pressure to the cylinder or chamber 80 of the controlling means for the shutoff valve 73. The water entering the cylinder 80 presses back the piston 81 and opens the shutoff valve 73 to admit water to the motor 63.

Figure 15:
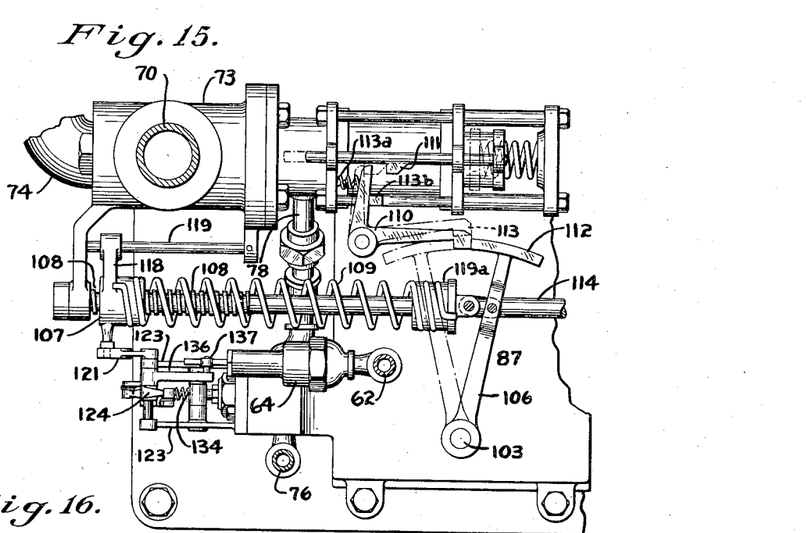
Fig. 15 is a view similar to Fig. 8, but with certain parts in different positions and other omitted.

When the stem of the shutoff valve has moved to a limited extent, the member 111 moving therewith permits the trigger 110 to move from its Fig. 8 position under influence of the spring 113a to its Fig. 15 position in engagement with the stop 113b, whereby the locking portion 113 will be positioned in the path of the part 112 of the reversing lever to lock the reversing lever in position to open the gate. The turbine or motor 63 then picks up speed during free revolutions due to the lost motion connection 88.

Figure 7:
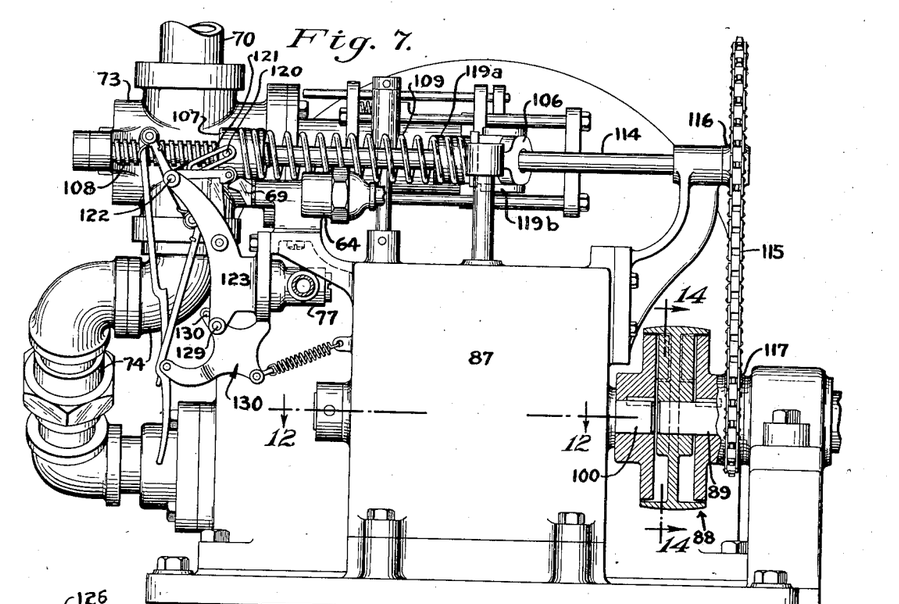
Fig. 7 is a side elevation of the structure shown in Fig. 6, the flexible coupling being shown in section.
Figures 9, 10, 14:
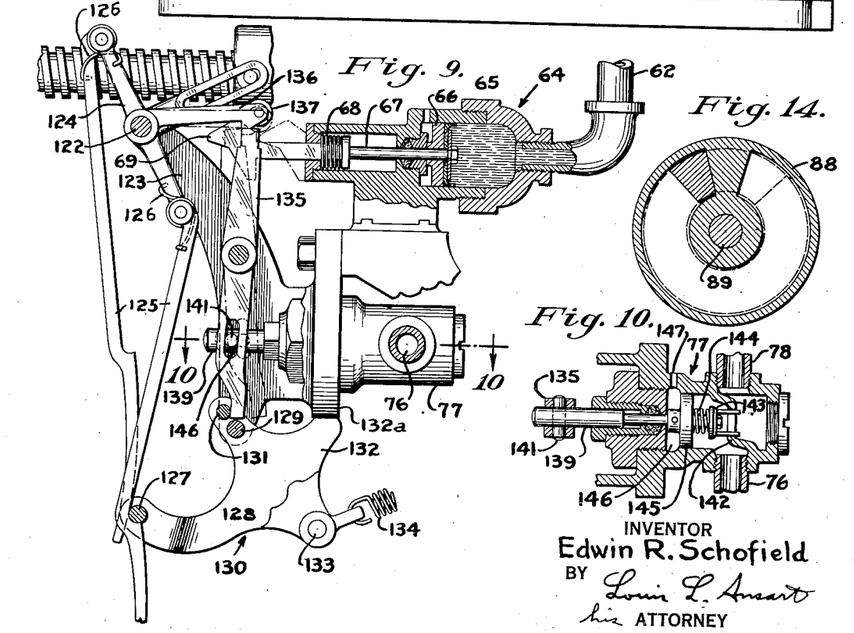
Fig. 9 is a detail view on a larger scale of the structure at the left in Fig. 7, parts being broken away to show the interior structure.
Fig. 10 is a section taken along the line 10—10 of Fig. 9.
Fig. 14 is a section taken along the line 14—14 of Fig. 7.

As soon as the lost motion at the coupling 88 is picked up, the shaft 89 will begin to rotate in a direction to open the sluice gate 28 and close the intercepting port 26, and the shaft 114 will begin to rotate to feed the limit nut 107 to the left from the position indicated in Figs. 7 and 8. This movement of the limit nut puts under tension the spring 109 connected with the reversing lever 106 which, however, is held against movement by the trigger 110 until the latter is shifted to releasing position by the trigger operating member during the subsequent closing of the shutoff valve 73. Also this movement of the limit nut 107 acts through the arm 121 to turn the double arm or lever 124 and, through one of the latches 125 connected thereto and engaging the pin 127, swing the lever 130 so that the pin 131 thereon will move the lever 135 to close the valve 77 and shut off the supply of water to the cylinder or chamber 80 of the shutoff-valve-operating means. At the end of this movement of the lever 135, its upper end is engaged by the latch or trigger 136 which acts to hold the valve 77 closed against the pressure of the water on the disc 145. The latch 125 is not released from pin 127 until after latch 136 has dropped into effective position, and as a matter of fact the arm 130 is moved far enough so that a cross piece of the arm 130 can engage a depending tail of the latch 125 and detach it from the pin 127. This additional movement is made possible by the spring 144 interposed between the disc 145 and the valve 143 (Fig. 10).

As soon as the valve 77 is closed, the spring 84 acts to close the shutoff valve 73, the water in the cylinder 80 being gradually expelled as water in the pipe 78 gradually passes out through the weeper 79. The water motor or turbine 63 continues its operation during part of the closing of the shutoff valve and completely opens the gate 28. The motor stops before the completion of the valve closing movement and, after the motor stops the trigger-actuating member 111 (moving with the piston 81) trips the trigger 110 and releases the reversing lever 106 which is then swung to the left to reverse the connections preparatory to closing the gate.

At this time the intercepting port 26 is completely closed and the outlet to the tidal stream is entirely open. In this connection it should be noted that this outlet extends down to the floor of the chamber 22 so that there is nothing to catch silt and other solid material which will be washed out into the stream.

Figure 5:
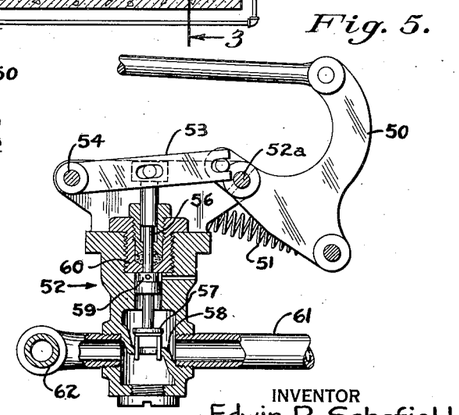
Fig. 5 is a detail view, partly in section, of structure at the upper right in Fig. 4.

When the storm ceases and the float 43 falls to the required extent, the rocking member 50 is shifted from its Fig. 5 position to carry the spring 51 past the pivot 52a so that this spring tends to close the valve 52 quickly. The valve 52 which was opened by the upward movement of the float due to the flood water in the sewer, remained open until the storm water receded and, after actuating the hydraulic tripper 64 to advance the double tripping cam 69 and release the trigger 136, held the cam 69 in advanced position until the valve 52 closed.

After the closing of the valve 52, the spring 68 acts to retract the cam 69 as the water in the chamber 65 and pipe 62 flows out through the weeper 64a. In this movement the cam 69 again trips the trigger 136 and releases the valve lever 135 thereby permitting the opening of the valve 77 and the passage of water under pressure through the lines 76 and 78 to the cylinder 80 where it acts to open the shutoff valve 73.

Upon a partial opening of the shutoff valve 73, the reversing gear trigger 110 is released by the actuating member 111 and is swung by its spring 113a into engagement with the stop 113b with its locking position in the path of the arcuate end 112 of the reversing lever 106, thus holding it in the position (shown in dot-and-dash lines in Fig. 15) for closing the sluice gate 28.

The opening of the shutoff valve 73 causes the motor 63 to start and the motor picks up speed in the free revolutions provided for by the lost motion coupling 88. As soon as the lost motion is taken up, the gate 28 begins to close and at the same time expose the intercepting port 26. The limit nut 107 also begins to move to the right (Fig. 15) and compress the actuating spring 109 toward the reversing lever 106 which at this time is held in its left hand position by reverse gear trigger 110 and will not be released until the trigger is engaged by actuating member 111 near the end of the closing of the shutoff valve.

In its movement to the right the limit nut 107 swings the double arm or lever 124 and through one of the latches 125 thereon pulls the snap valve arm 130 into position to place the lever 135 in position to close valve 77 and start the closing of the shutoff valve to stop the motor. The lever 135 is latched in the position by the trigger 136. The snap valve arm 130, as soon as released by the latch 125 is restored to its starting position by means of the spring 134.

The shutoff valve 73 closes gradually as the water from the chamber 80 is released through the weeper 79, and the motor slows down. The gate 28 may be closed and the motor stopped slightly before the shutoff valve proper 82 stops moving and just after the motor stops the reverse gear trigger 110 is released and the spring 109, which has been placed under compression, throws the reversing lever 106 to the right, thereby completing the restoration of the apparatus to its normal condition.

As disclosed the shutoff valve 73 is of a slide type and in closing permits additional movement of the valve member 82 and actuating piston 81 after the flow of water is shut off and in opening allows a preliminary movement of these parts before the water begins to flow through this valve. This arrangement provides for operating and releasing the trigger 110 to release or lock the reversing lever 106. It should be understood that the same result may be obtained in other ways.

In view of the designation of members 110 and 136 as triggers, this line of terminology may be carried further by specifying the members 106 and 135 and the parts controlled thereby as "cocked" when they are latched in position by said triggers.

It should be understood that various changes may be made and that certain features can be used without others without departing from the true scope and spirit of the invention.

Having thus described my invention, I claim:

1. In a sewage system comprising a district sewer, an interceptor sewer into which sewage from the district sewer normally flows and an outlet through which flood water and sediment from the district sewer may be freely discharged: a sluice gate normally extending across such flood water outlet and preventing the passage of liquid in either direction, and means controlled by the liquid level in said district sewer for moving said gate to open the flood water outlet and for preventing the flow of sewage into the interceptor sewer when said liquid level rises above a predetermined level and for closing the gate and admitting sewage to the interceptor sewer when the liquid level falls below a predetermined level.

2. In a sewage system comprising a district sewer, an interceptor sewer, a port through which sewage normally passes from the district sewer to the interceptor sewer, and an outlet for the discharge of flood water from said district sewer: means controlled by the liquid level in said district sewer for opening said outlet and closing said port when the liquid level in the district sewer rises to a predetermined level and for closing said outlet and opening said port when the liquid level in the district sewer falls below a predetermined level.

3. In a sewage system comprising a district sewer, an interceptor sewer connected with said district sewer to receive sewage therefrom and an outlet for flood water from said district sewer: closure means for preventing the flow of liquid through such flood water outlet, and means including a motor connected with said closure means to open and close the same and control means acting upon the rise of the liquid level in said district sewer to a predetermined extent to start the motor and cause it to open said closure means to enable the liquid to pass out through said outlet and to stop the motor upon completion of such opening, and acting upon subsequent fall of the liquid level in said district sewer to a predetermined level to start the motor and cause it to close said closure means and upon completion of such closing to stop the motor.

4. In a sewage system comprising a district sewer, an interceptor sewer adjacent to tide water, a collecting chamber to receive sewage from said district sewer, a port through which sewage passes from said chamber to said interceptor sewer and a storm water outlet for discharging storm water from said chamber to said tide water: a tide gate normally closing said outlet to prevent the tide from entering the district sewer and flowing into the interceptor sewer, and gate-operating means rendered effective upon rise of liquid level in the district sewer to a predetermined level to open the tide gate and discharge the excess liquid through said outlet and upon the falling of said liquid level to a predetermined level to close said gate.

5. In a sewage system comprising a district sewer, an interceptor sewer to receive sewage from the district sewer and a storm-water-discharge outlet discharging from said district sewer into tidal waters: a tide gate normally closing said discharge outlet to prevent the entrance of the tide and also pollution of said tidal waters, and means effective upon the rise of the sewage level in the district sewer to a predeteremined height to open the gate and discharge the excess sewage into said tidal waters, and upon the fall of said sewage level to a predetermined level to again close the gate.

6. In a sewage system comprising a district sewer, an interceptor sewer to receive sewage from the district sewer and a storm-water-discharge outlet to discharge into tidal waters: a tide gate normally closing said outlet to prevent the tide from entering said sewers, gate-operating means effective if thrown into operation when the gate is closed to open the gate and then stop and if thrown into operation when the gate is open to close the gate and then stop, and float-controlled means effective, when the sewage level in the district sewer rises to a predetermined level, to start the opening of the gate and, when the sewage level falls to a predetermined level, to start the closing of the gate.

7. In a sewage system comprising a district sewer, an interceptor sewer connected with the district sewer to receive sewage therefrom and an outlet to discharge sewage from said district sewer into tidal waters: a tide gate normally closing said outlet, a motor, means driven by said motor for opening and closing said gate, means for starting said motor when the level of the sewage in said district sewer rises to a predetermined level and when it falls to a predetermined level, means acting between successive gate-opening and gate closing operations to reverse the action of said motor on said gate, and means to stop said motor at the end of each gate-opening operation and at the end of each gate closing operation.

8. The combination with a district sewer, an interceptor sewer connected with the district sewer to receive sewage therefrom and an outlet to discharge sewage from said district sewer into tidal waters, of a tide gate normally closing said outlet, a motor, motor-starting means including a controlling member yieldably urged in a direction to stop the motor and arranged to have a limited idle movement both after starting the motor and after stopping the motor, gate-operating means operated by said motor and having a reversing device, means operable upon both rise and fall of sewage level in the district sewer to move said controlling member to start the motor and upon completion of both opening and closing operations to release the controlling member to stop the motor, a latch yieldably urged toward said reversing device to prevent reversing action thereof, means for withdrawing said latch just after the controlling member stops the motor and for releasing the latch just before the controlling member starts the motor, and means actuated by the motor during each operation thereof to move the controlling member to motor-stopping position and to act on said reversing device so that upon release of the latch the connection between the motor and the gate will be reversed.

9. The combination with a district sewer, an interceptor sewer receiving sewage therefrom, and an outlet to discharge storm water from the district sewer into tidal waters, of a tide gate normally closing said outlet, a motor and motor-operated means for alternately opening and closing said gate, a starting and stopping device for said motor including a control member yieldably urged in a direction to stop the motor, means for moving said control member in a direction to start the motor, a shutoff device for such moving means yieldably urged to going position, motor-actuated means to operate the shutoff device to stop the motor, a trigger to latch the shutoff device against action, and means to trip the trigger either when the sewage level rises to a predetermined level or falls to a predetermined level.

10. The combination with a district sewer, an interceptor sewer receiving sewage therefrom and an outlet to discharge storm water from said district sewer into tidal waters, of a tide gate controlling the passage of sewage from said district sewer to said interceptor sewer and said outlet, said tide gate normally closing said outlet, and gate-operating means for opening said tide gate when the sewage level rises to a predetermined level and closing said tide gate when said sewage level falls to a predetermined level, said gate-operating means including a gate-operating motor, a starting device yieldably urged to start the motor and thereby operate the gate, a trigger to restrain the starting device from starting the motor, means for operating the trigger to release the starting device, and means operated by the motor to restore the starting device to control by the trigger and thereby stop the motor at the end of each opening and closing movement of the tide gate.

11. The combination with a district sewer, an interceptor sewer receiving sewage therefrom and an outlet to discharge storm water from said district sewer into tidal waters, of a tide gate controlling the passage of sewage from the district sewer to said interceptor sewer and said outlet, said tide gate normally closing said outlet, and gate-operating means for opening said gate when the sewage level in the district sewer rises to a predetermined level and for closing said gate when said sewage level falls to a predetermined level, said gate-operating means including a gate-operating motor, a reversing device in the connection between the motor and the gate, said reversing device including a reversing lever, a screw rotated in one direction when the gate is opening and in the other when the gate is closing, a nut on said screw, a spring connection between said nut and said reversing lever whereby the spring will be tensioned during movement of the gate in one direction and compressed during movement of the gate in the other direction, and a trigger rendered effective before each movement of the gate to hold said reversing lever and shifted to release the reversing lever after the completion of each movement of the gate.

12. The combination with a district sewer, an interceptor sewer receiving sewage therefrom, and an outlet to discharge storm water from said district sewer into tidal waters, of a tide gate controlling the passage of sewage from the district sewer to said interceptor sewer and said outlet, said gate normally closing said outlet to keep out the tide, and gate-operating means for opening and closing said gate in accordance with the rise and fall of the sewage in the district sewer to predetermined levels, said gate-operating means including a gate-operating motor, a starting device yieldably urged to start the motor, a trigger to restrain the starting device from starting the motor, means for tripping the trigger to release the starting device upon the rise and fall of the sewage in the district sewer to said predetermined levels, and means for restoring the starting device to the control of said trigger including a screw rotated in one direction during the opening of the gate and in the other direction during the closing of the gate, a nut on said screw, and means operated by said nut in both of its movements to restore the starting device to control by said trigger.

13. The combination with a district sewer, an interceptor sewer receiving sewage therefrom and an outlet to discharge storm water from said district sewer into tidal waters, of a tide gate controlling the passage of sewage from said district sewer to said interceptor sewer and said outlet, said gate normally closing said outlet to keep out the tide, and gate-operating means for opening and closing said gate in accordance with the rise and fall of the sewage in the district sewer to predetermined levels, said gate-operating means including a gate-operating motor, a starting device yieldably urged to start the motor, a trigger to restrain the starting device from starting the motor, means for tripping the trigger to release the starting device, a reversing device including a reversing lever and forming part of the driving connection between the motor and the gate, a spring having one end operatively connected with said reversing lever, a nut operatively connected with the other end of said spring, a screw carrying said nut and actuated in opposite directions, in accordance with the opening and closing of the gate, to act on the spring and thereby urge the reversing lever in one direction or the other, a trigger to prevent shifting of the reversing lever, means to trip the reversing-lever trigger upon the stopping of the motor, and means operated by the nut in both of its movements to restore the starting device to control by its trigger.

14. The combination with a district sewer, an interceptor sewer receiving sewage therefrom and an outlet to discharge sewage from the district sewer to tidal waters, of a tide gate controlling the passage of sewage from said district sewer to said interceptor sewer and said outlet, said gate normally closing said outlet to keep out the tide, and gate-operating means for opening and closing said gate in accordance with the rise and fall of the sewage in the district sewer to predetermined levels, said gate-operating means including a gate-operating motor, a starting device yieldably urged to start the motor, a trigger to restrain the starting device from starting the motor, a reciprocating tripping device effective in either direction of movement to trip the trigger, and actuating means for said tripping device whereby the same will be moved in one direction upon rise of the sewage level in the district sewer to a predetermined level and in the other direction upon fall of such sewage level to a predetermined level.

15. The combination with a district sewer, an interceptor sewer receiving sewage therefrom and an outlet to discharge sewage from the district sewer to tidal waters, of a tide gate controlling the passage of sewage from said district sewer to said interceptor sewer and said outlet, said gate normally closing said outlet to keep out the tide, and gate-operating means for opening and closing said gate in accordance with the rise and fall of the sewage in the district sewer to predetermined levels, said gate-operating means including an hydraulic gate-operating motor, a shutoff valve biased to close and shut off the supply of driving fluid from said motor, hydraulic means for opening said shutoff valve, a control valve for the shutoff-valve-opening means, said control valve being biased to open, means actuated by the motor to close the control valve, means for holding said control valve closed and means for releasing the control valve when the sewage in the district sewer reaches predetermined levels.

16. The combination with a district sewer, an interceptor sewer receiving sewage therefrom and an outlet to discharge sewage from the district sewer to tidal waters, of a tide gate controlling the passage of liquid through said outlet and into said interceptor sewer, said gate normally closing said outlet, and gate-operating means for opening and closing said gate in accordance with the rise and fall of the sewage in the district sewer to predetermined levels, said gate-operating means including a motor, a primary control device operated by the rise and fall of the sewage level to predetermined levels, a starting and stopping device for said motor, a secondary control device controlling said starting and stopping device, and means actuated by said motor to act on said secondary control and therethrough on said starting and stopping device to stop the motor and influenced by the primary control to render the starting and stopping device effective to stop the motor.

17. The combination with a district sewer, an interceptor sewer receiving sewage therefrom and an outlet to discharge sewage from said district sewer into tidal waters, of means including a tide gate for controlling the discharge of sewage from said district sewer through said interceptor sewer and said outlet, said tide gate normally closing said outlet to prevent the entrance of tide water into said district and interceptor sewers, and gate-operating means for opening said gate when the sewage in said district sewer rises to a predetermined level and closing the gate when the sewage falls to a predetermined lever, said gate-operating means including a motor, means for starting the motor for gate-opening when the sewage in the district sewer rises to the predetermined level and for starting the motor for gate-closing when the sewage falls to the predetermined level, and means operated by the motor for stopping the motor at the completion of each gate-closing and gate-opening operation.

18. The combination with a district sewer, an interceptor sewer receiving sewage therefrom and an outlet to discharge sewage from said district sewer into tidal waters, of means including a tide gate for controlling the discharge of sewage from said district sewer through said interceptor sewer and said outlet, said tide gate normally closing said outlet to prevent the entrance of tide water into said district and interceptor sewers, and gate-operating means for opening and closing the gate including a water motor, a shutoff valve for said motor, operating means for the shutoff valve including a spring tending to close the valve, a piston and a cylinder into which water under pressure may be admitted to open the shutoff valve, a control valve controlling the admission of water to said cylinder and being constantly urged to open condition, means actuated by said motor to close said control valve at the end of each opening and closing of the gate, a trigger to hold said control valve closed, a weeper to enable water to be forced out of said cylinder when the control valve is closed and thus enable said spring to close the shutoff valve, and means to trip said trigger when the sewage in the district sewer rises to a predetermined level and when it falls to a predetermined level.

19. The combination with a district sewer, an interceptor sewer receiving sewage therefrom and an outlet to discharge sewage from said district sewer into tidal waters, of means including a tide gate for controlling the discharge of sewage from said district sewer through said interceptor sewer and said outlet, said tide gate normally closing said outlet, and gate-operating means for alternately opening and closing said gate in accordance with rise and fall of sewage in the district sewer including a member movable in one direction to start the gate-opening operation and in the other to start the gate-closing operation, a spring urging said member in the direction to cause gate opening, and means to move said member in the direction to cause gate closing including a piston, a cylinder containing said piston, a pressure water line connected with said cylinder, a snap valve controlling said water line, a float operating said snap valve in accordance with the rise and fall of sewage in the district sewer, and a weeper in said water line between said cylinder and said valve.

EDWIN R. SCHOFIELD.